Figure 1:
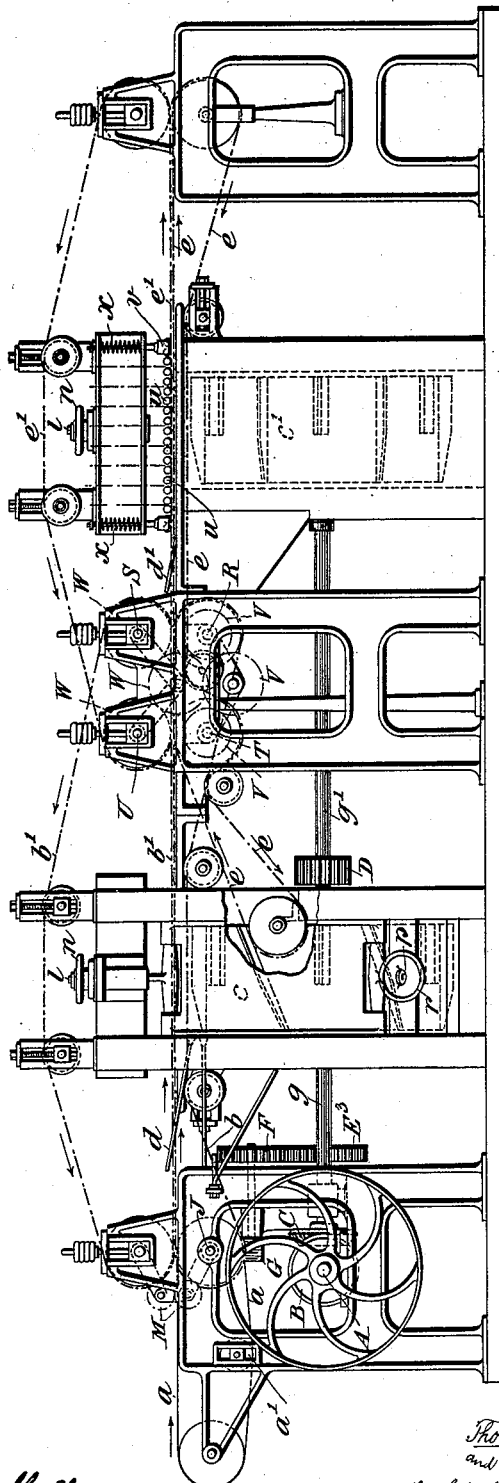

(No Model.) 6 Sheets—Sheet 1.
T. C. BARRACLOUGH & T. T. HEATON.
MACHINE FOR EXTRACTING FIBER FROM FIBER BEARING PLANTS.
No. 568,327. Patented Sept. 29, 1896.

WITNESSES:
Fred White
Thomas F. Wallace

INVENTORS:
Thomas Critchley Barraclough,
and Thomas Jannett Heaton,
By their Attorneys:
Arthur C. Fraser & Co.

(No Model.) 6 Sheets—Sheet 2.
T. C. BARRACLOUGH & T. T. HEATON.
MACHINE FOR EXTRACTING FIBER FROM FIBER BEARING PLANTS.
No. 568,327. Patented Sept. 29, 1896.

(No Model.) 6 Sheets—Sheet 3.

T. C. BARRACLOUGH & T. T. HEATON.
MACHINE FOR EXTRACTING FIBER FROM FIBER BEARING PLANTS.

No. 568,327. Patented Sept. 29, 1896.

(No Model.) 6 Sheets—Sheet 5.
T. C. BARRACLOUGH & T. T. HEATON.
MACHINE FOR EXTRACTING FIBER FROM FIBER BEARING PLANTS.
No. 568,327. Patented Sept. 29, 1896.

WITNESSES: Fred White, Thomas F. Wallace

INVENTORS: Thomas Critchley Barraclough, and Thomas Tunnett Heaton, By their Attorneys Arthur C. Fraser & Co.

(No Model.) 6 Sheets—Sheet 6.

T. C. BARRACLOUGH & T. T. HEATON.
MACHINE FOR EXTRACTING FIBER FROM FIBER-BEARING PLANTS.

No. 568,327. Patented Sept. 29, 1896.

WITNESSES:
Fred White
Thomas F. Wallace

INVENTORS:
Thomas Critchley Barraclough
and Thomas Tannett Heaton,
By their Attorneys:
Arthur C. Fraser & Co.

UNITED STATES PATENT OFFICE.

THOMAS CRITCHLEY BARRACLOUGH AND THOMAS TANNETT HEATON, OF LONDON, ENGLAND.

MACHINE FOR EXTRACTING FIBER FROM FIBER-BEARING PLANTS.

SPECIFICATION forming part of Letters Patent No. 568,327, dated September 29, 1896.

Application filed May 4, 1896. Serial No. 590,142. (No model.)

*To all whom it may concern:*

Be it known that we, THOMAS CRITCHLEY BARRACLOUGH and THOMAS TANNETT HEATON, engineers, of 20 Bucklersbury, London, England, have invented certain new and useful Improvements in Machinery for Extracting or Obtaining Fiber from the Leaves or Stems of Fiber-Bearing Plants, of which the following is a specification.

This invention relates to extracting or obtaining fiber from the leaves or stems of fiber-bearing plants by machinery of the kind in which the leaves or stems are fed by feed-chains to a first scutching apparatus, where one-half, approximately, of the length of the leaves or stems is scutched, and they are then fed by other feed-chains to a second scutching apparatus, where the remainder of the length of the leaves or stems is scutched. The object of the invention is to so improve the construction of such machinery as to render it more efficient and capable of producing more fiber in a given time.

The invention consists in the combination, with two sets of scutching apparatus, the axes of the drums of which are not in the same vertical plane, of two pairs of feed-chains, one of which feeds the leaves or stems to and through the first scutching apparatus and the other pair of which carries the partly-scutched leaves or stems from the first scutching apparatus to and through the second, the lower chain of the second pair being inclined downward and passing over a pulley inside the drum of the first scutching apparatus. A characteristic feature of this combination is the downward inclination of the said lower chain and its position at one end of its travel inside the drum of the first scutching apparatus, because the fiber which has been scutched in this apparatus must, with this arrangement, fall upon this part of the chain and be carried by it up the incline until it is gripped between this chain and the upper chain of the second pair, the chains of the first pair retaining their hold of the unscutched portion of the stems or leaves until the second pair have got the fiber between them.

The invention further consists in the combination, with the lower chain, of the second pair of projections fixed at one side of said lower chain to assist in carrying the fiber forward.

The invention also consists in the combination, with each scutching-drum, of a curved shield or concave trough to support the stems or leaves under the action of the scutchers or beaters on the drum, the said curved shield covering a portion of the drum and being suspended at its upper part on a hinge and capable of being regulated so that it can be set at an angle with the surface of the drum and at a greater or less distance therefrom, as required.

The construction and operation of our improved machinery will be fully understood by the accompanying illustrative drawings and the following description of same.

Figure 2:
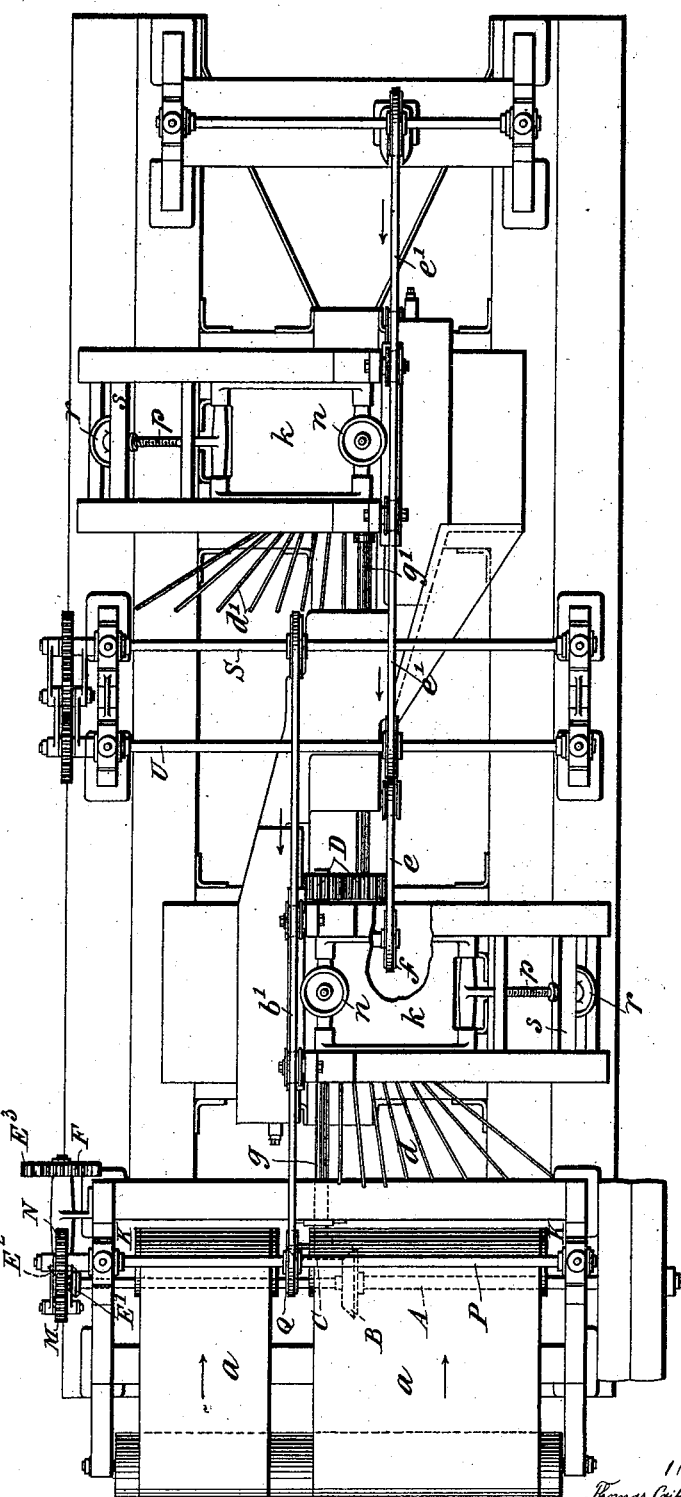
Figure 3:
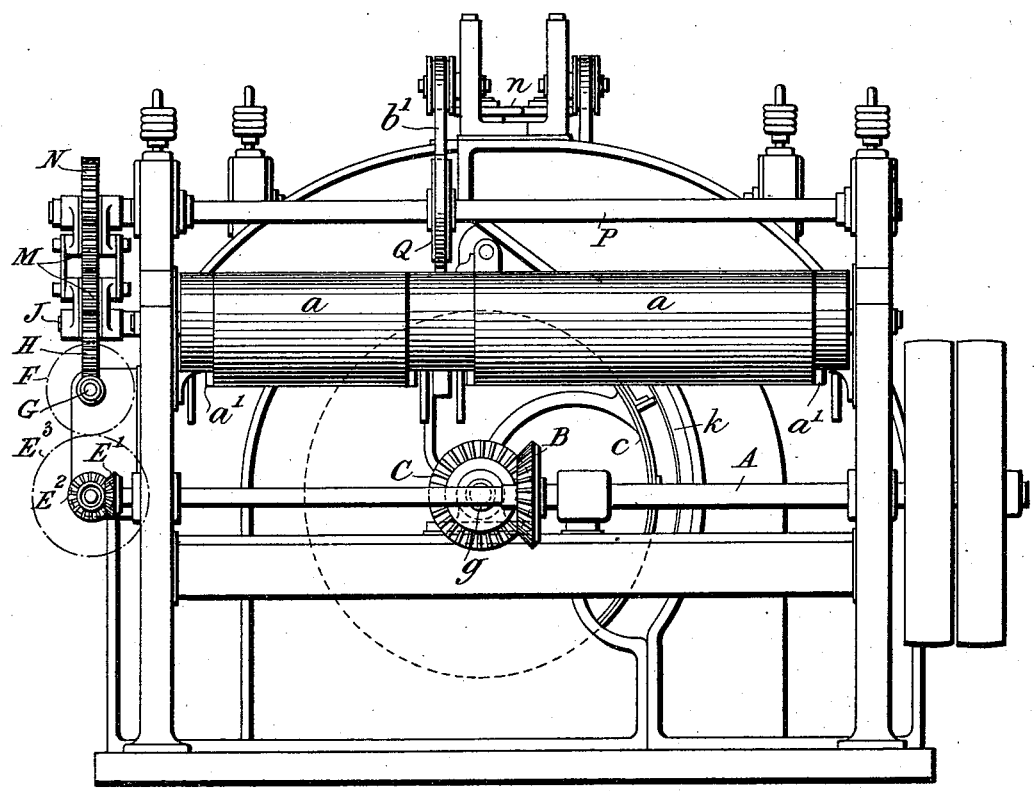
Figure 4:
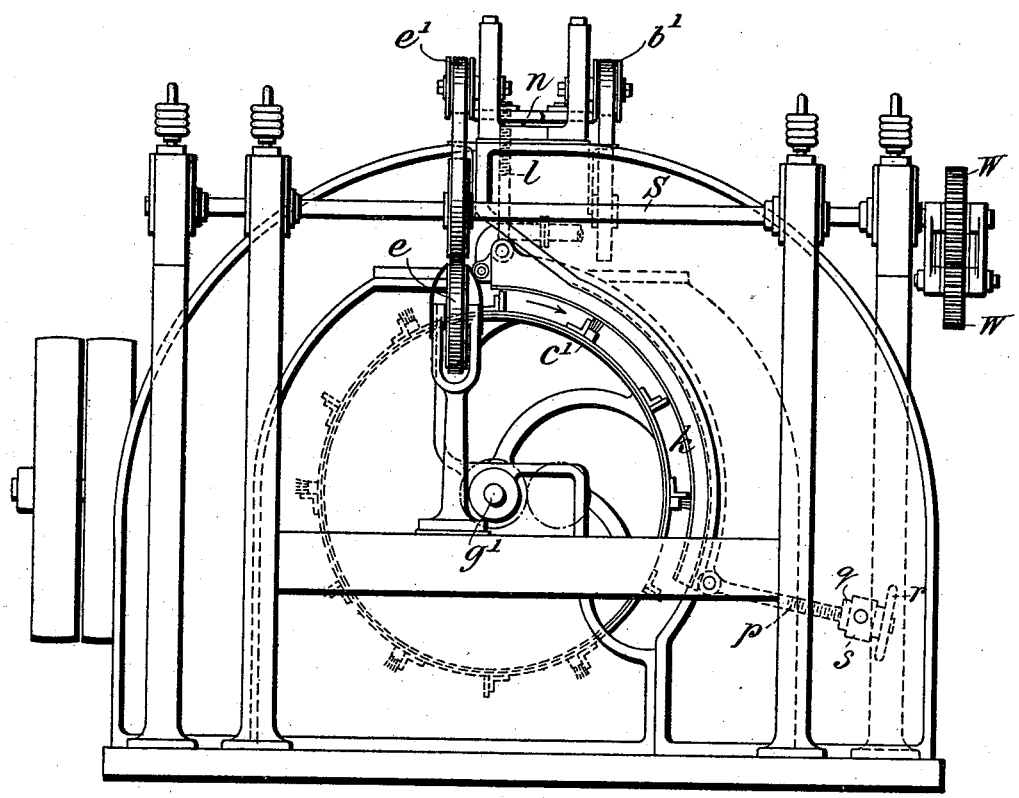
Figure 5:
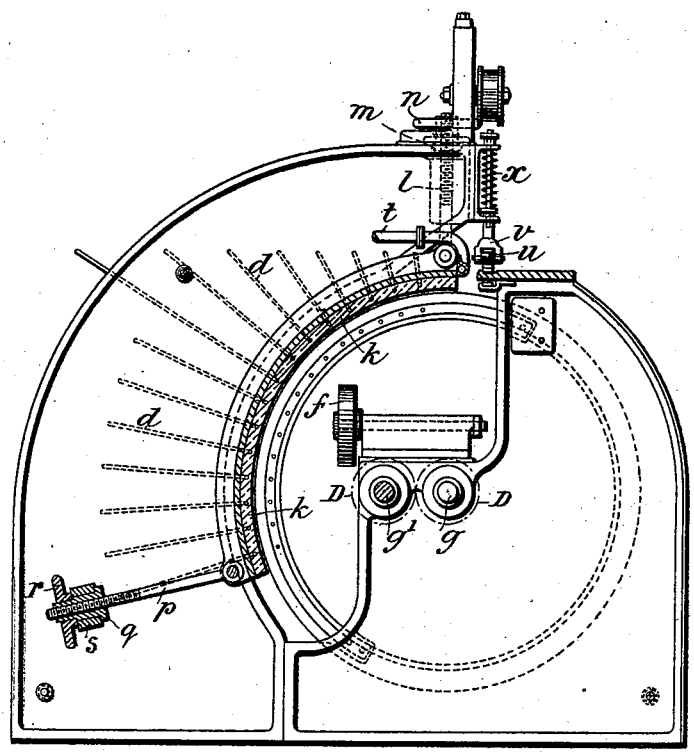
Figure 6:
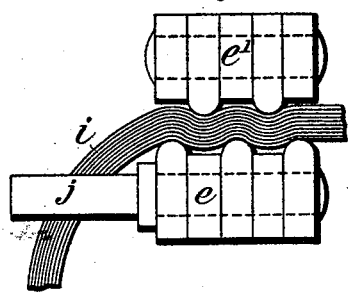
Figure 7:
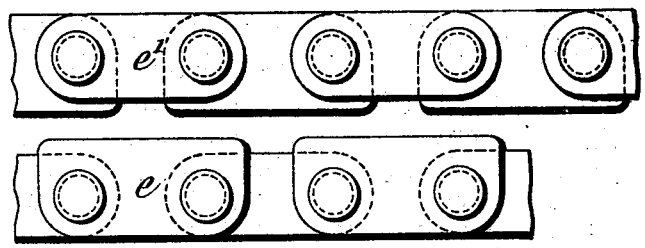
Figure 8:
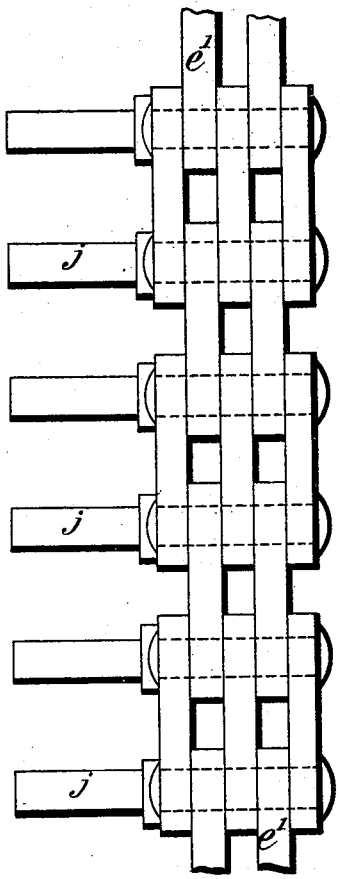

Figure 1 is a side elevation of the machinery. Fig. 2 is a plan; Fig. 3, an elevation of the feed end, and Fig. 4 an elevation of the delivery end. Fig. 5 is a transverse section of the first scutching apparatus, but with the drum itself removed, its outline and the path of the beaters being shown by dotted lines. Figs. 6, 7, and 8 are respectively an end view, a side view, and a plan, of a portion of the second pair of feed-chains. Figs. 3, 4, and 5 are on a larger scale than Figs. 1 and 2, and Figs. 6, 7, and 8 are on a still larger scale.

$a$ is an endless traveling feed-band, upon which the leaves or stems to be treated are fed by an attendant, the said leaves or stems being laid on the band transversely of the machine. Provision is made by means of a weighted roller $a'$ for keeping the feed-band tight and level on the top.

$b\ b'$ are lower and upper endless traveling feed-chains, forming a pair, to which the leaves or stems are carried by the band $a$. These chains grip the leaves at an intermediate part of their length and carry them to the first scutching-drum $c$, by which the fiber is extracted from that portion of the leaves which is at the right-hand side of the chains $b\ b'$, the set of guide-rods $d\ d$ serving to conduct this half of the leaves to the drum. The scutched fiber hangs downward on leaving the drum $c$ and rests upon the lower chain $e$ of a second pair of upper and lower endless traveling feed-chains $e\ e'$, the lower chain $e$ of this pair being inclined downward, as shown, so as to pass under the rim of the drum c and over a pulley f. While the chain e travels upward from the pulley f it carries with it the fiber that rests upon it, and this is assisted by the first pair of chains b b', which have not yet released the leaves. Before the chains b b' do release the leaves the fiber is in the grip of the chains e e', which then carry forward the partly-scutched leaves to the second drum c', where the unscutched portion is scutched. The guide-rods d' d' serve to conduct the second portion of the leaves to the drum. On leaving the drum c' the fiber is carried on by the feed-chains e e' and delivered by them over the end of the machine. The chains are provided with the means of adjustment shown in the drawings for keeping them sufficiently tight. These means of adjustment will be readily understood from the figures.

It will be observed that the shafts g g' of the two drums c c' are parallel but are not in the same vertical plane.

The preferred construction of the second pair of feed-chains e e' is shown in Figs. 6, 7, and 8, and will be understood without further explanation. It may be stated, however, that the lower chain e has projecting pins j to assist in supporting and carrying forward the fiber i, Fig. 6. These pins may be either straight, as shown, or be otherwise suitably formed. The first pair of feed-chains b b' may be of the same construction as the second pair, as shown in Figs. 6, 7, and 8, except that the pins j are not required.

The scutching-drums c c' are provided with suitable beating devices. Those shown are what we consider best for ordinary use, and consist of beaters and brushes arranged alternately on the periphery and helically or otherwise.

Above each drum is a concave trough or curved shield k, the inner surface of which is preferably of hard wood lined with sheet metal, and its curve is struck from the same center as the drum. The leaves bear against this surface while being acted upon by the beaters and brushes.

As the leaves or stems to be acted upon are often of irregular shape and larger or smaller at one end than in the middle we make the concave trough k capable of vertical adjustment from the top and of horizontal adjustment at the bottom and we hang or suspend it from its upper part. With this object we hang it to the vertical supporting-screw l, which is capable of vertical adjustment by means of a nut m with hand wheel or lever n for turning it, the connection between the concave trough k and the screw l forming a hinge which allows the concave trough to be set at an angle without appreciably affecting the distance from the center line of the drum, at which the scutching action begins. For the horizontal adjustment in order to set the concave trough at an angle with the surface of the drum a screw p is hinged to the back of the concave trough at the lower part, and on this screw is a nut q with hand-wheel r for turning it, the nut being carried in a swiveling bearing s, so that the supporting-screw l can be freely moved up and down.

t, Fig. 5, represents a pipe by means of which water can be supplied to the scutching apparatus in order to cleanse and wash the fiber during the scutching operation. Provision should be made in the bed of the machine for carrying away the refuse and waste water.

Above each scutching-drum is a device for putting pressure on the feed-chains at the point where the scutching action tends to pull the leaves or fiber from the grip of the chains. This device consists of a series of rollers u u, Figs. 1 and 5, upon which forks v bear. These forks are forced down by springs x, the pressure of which is capable of regulation, as required.

We will now proceed to describe the mechanism by which the various parts of the machine are driven.

A is the driving-shaft; B, a bevel-wheel thereon gearing with another wheel C on the longitudinal shaft g on which the first drum c is mounted. From the shaft g rotary motion is transmitted by spur-wheels D D to the shaft g' on which the second drum c' is mounted. At one end of the shaft A is a bevel-pinion E', gearing with another bevel-pinion $E^2$ on a shaft which carries a spur-wheel $E^3$, which gears with a spur-wheel F on the shaft of the worm G. This worm gears with a worm-wheel H on the shaft J, which carries one of the rollers K of the feed-band a and also one of the pulleys of the lower feed-chain b. From the wheel H motion is transmitted by the pinions M M to a wheel N on the shaft P, which carries one of the pulleys Q of the upper chain b'. The feed-chains b b', at the other end of their course, drive the shafts R S. From the shaft R the motion is transmitted by intermediate toothed gearing V V V, as clearly shown in the figures, to the shaft T, which carries one of the pulleys of the feed-chain e. From the shaft S the motion is transmitted by intermediate toothed gearing W W W to the shaft U, which carries one of the pulleys of the feed-chain e'. The feed-chains e and e' are thus driven. The gearing, in connection with the shafts P U S, is so arranged that the said shafts are capable of automatically rising to suit the thickness of the material gripped by the feed-chains. The shaft can also rise for the same purpose.

What we claim, and desire to secure by Letters Patent, is—

1. In machinery for extracting or obtaining fiber from the leaves or stems of fiber-bearing plants, the combination with two sets of scutching apparatus the axes of the drums of which are not in the same vertical plane, of two sets of feed-chains one pair of which feeds the leaves or stems to and through the first scutching apparatus and the other carries the partly-scutched leaves or stems from the first scutching apparatus to and through the second scutching apparatus the lower chain of the second pair being inclined downward and extending into the interior of the drum of the first scutching apparatus whereby the fiber after being scutched by this drum falls upon this chain and is carried upward by it until it is gripped between this chain and the upper chain of the second pair, substantially as hereinbefore described.

2. In fiber-extracting machinery the combination of two sets of scutching apparatus and two pairs of feed-chains arranged as set forth, the lower chain of the second pair of chains provided with projections at one edge of said lower chain to assist in carrying the fiber forward, substantially as hereinbefore described.

In witness whereof we have hereunto signed our names in the presence of two subscribing witnesses.

THOMAS CRITCHLEY BARRACLOUGH.
   THOMAS TANNETT HEATON.

Witnesses:
 ERNEST WINSTONE,
 ROBERT M. SPEARPOINT.